US008576454B2

(12) United States Patent
Shirai et al.

(10) Patent No.: US 8,576,454 B2
(45) Date of Patent: Nov. 5, 2013

(54) IMAGE FORMING DEVICE, IMAGE FORMING METHOD AND PROGRAM

(75) Inventors: Toshiaki Shirai, Tokyo (JP); Hiroshi Ooya, Machida (JP); Atsushi Ikeda, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 834 days.

(21) Appl. No.: 12/371,371

(22) Filed: Feb. 13, 2009

(65) Prior Publication Data

US 2009/0213419 A1 Aug. 27, 2009

(30) Foreign Application Priority Data

Feb. 22, 2008 (JP) ................................ 2008-041967

(51) Int. Cl.
*G06T 5/00* (2006.01)

(52) U.S. Cl.
USPC ........................................................ 358/3.26

(58) Field of Classification Search
USPC ........................................................ 358/3.26
See application file for complete search history.

(56) References Cited

U.S. PATENT DOCUMENTS 4,937,664 A 6/1990 Chiku et al. .................... 358/75
6,474,767 B1 * 11/2002 Teshigawara et al. .......... 347/19
7,002,701 B1 2/2006 Nakayasu et al. ........... 358/1.12
7,489,328 B2 * 2/2009 Akamatsu ...................... 347/235
2006/0176526 A1 * 8/2006 Iannazzi ....................... 358/504
2007/0139746 A1 * 6/2007 Akamatsu ...................... 359/205
2009/0174913 A1 7/2009 Ikeda et al. ................... 358/474

FOREIGN PATENT DOCUMENTS

JP 2633877 4/1997
JP 3388193 1/2003

OTHER PUBLICATIONS

U.S. Appl. No. 12/345,523, filed Dec. 29, 2008 by Atsushi Ikeda, Hiroshi Ooya and Toshiaki Shirai.

* cited by examiner

*Primary Examiner* — Marivelisse Santiago Cordero
*Assistant Examiner* — John Wallace
(74) *Attorney, Agent, or Firm* — Fitzpatrick, Cella, Harper & Scinto

(57) ABSTRACT

The problem of the present invention is to be capable of executing color shift correction processing also in consideration of a mechanical inclination component in an image forming device. For solving the problem, the image forming device according to the present invention comprises information processing unit, first measurement requesting unit, holding unit of curve information, notifying unit of curve information, receiving unit of a measurement pattern image, measurement processing unit, determining unit of a result of the measurement processing, and second measurement requesting unit.

20 Claims, 14 Drawing Sheets

IMAGE FORMING DEVICE, IMAGE FORMING METHOD AND PROGRAM

BACKGROUND OF THE INVENTION

1. Field of the Invention

The present invention relates to an image forming device, an image forming method and a program, and in particular to an image forming device, an image forming method and a program which digitally correct a curve component of a laser beam and a mechanical inclination component.

2. Description of the Related Art

For correcting a color shift between colors in a color image forming device of a so-called tandem type, as shown in Japanese Patent No. 2633877, there is a method where a pattern image for registration correction is formed on an intermediate transfer belt and the pattern image is read with an image sensor. In such a method, a shift amount between pattern images for registration correction of the respective colors obtained by the reading is feedback-controlled to the image forming process of color plate image of each color (C, M, Y, K) to correct the color shift of each color.

On the other hand, there is known a method in which, for example, by an application of a technology disclosed in Japanese Patent No. 3388193, costs are reduced by cutting down on the process of a laser scanner adjustment and digitally correcting a curve component of a laser beam in an electronic photography-related image forming device.

For example, in the digital correction in a sub scan direction of a scan line, an image is formed by appropriately changing a line of the image data to be formed to be capable of canceling out a curve amount based upon a curve component of the laser beam beforehand obtained. That is, when the laser beam is shifted by one line lower for a sub direction of the laser on certain position of a main scan direction of the laser, in order to correct the shift, image data of one line upper on certain position of the sub direction of the laser is read from a memory which stores the image data. And the image of the image data is formed. Here, a line is a collection of pixels arranged in the main scan direction.

In detail, for example, when a curve component of a laser beam is expressed by f(x) to a main scan position X, numeral-y obtained by rounding off f(x) is set as a line changing amount and all of data of a section from xi to xj which the line changing amount is equal are shifted by a −y line amount. When this is applied to all image regions, the curve component of the laser beam can be cancelled out to reproduce an original image.

Further, as another technology, there is a method in which the above color shift correction of the respective colors and the digital correction processing are combined to digitally correct a mechanical inclination component together with the curve component of the laser beam.

In this case, an allowance amount of the color shift correction of each color is frequently very similar to a line changing amount by the mechanical inclination component. In a case of forming a pattern image for registration correction without consideration of the mechanical inclination component, the formed pattern image possibly exceeds a range in which a device can measure the formed pattern image as the color shift amount. In such a case, the color shift can not be corrected.

In such a case, the correction may be possible by variously modifying the color shift amount measurement and the calculation processing for correction, but the processing itself can be complicated or a plurality of the exceptional processing become required. For avoiding this event, it is preferable that the pattern image for the registration correction is also formed on the intermediate transfer belt by performing digital correction including the above line changing processing in consideration of the curve component of the laser beam and the mechanical inclination component.

However, in a case of performing the digital correction to the mechanical inclination component in addition to the curve component of the laser beam as in the case of the conventional technology, the curve component of the laser beam is always constant and on the other hand, the mechanical inclination component is a variable data. The curve component of the laser beam is a fixed data because of dependence on a mounting position of a laser scanner unit to a color image forming device.

Therefore, in regard to formation of the pattern image for the registration correction at the time of performing the color shift amount measurement, the following processing is required to be executed. That is, an update mechanical inclination component is always applied to the pattern image for the registration correction to generate an image and the color shift amount measurement is required to be performed using the pattern image for the registration correction including the correction of the mechanical inclination component.

If it is required simply to correct only a fixed value such as the curve component of the laser beam without consideration of the mechanical inclination component in regard to formation of the pattern image for the registration correction upon performing the color shift amount measurement, the following processing may be executed. That is, the pattern image for the registration correction which is corrected by the predetermined curve component of the laser beam is stored in advance and this pattern image is formed as an image by the laser. And the color shift amount measurement may be performed by this image formed by the pattern image. In this case, the pattern image for the registration correction may use a fixed image to which the line changing processing to cancel out the curve component of the laser beam in advance known is executed.

However, the following processing is required to be executed for regularly applying the update mechanical inclination component for the pattern image for the registration correction at each time of measuring the color shift amount. That is, it is required to update the pattern image for the registration correction at each time of measuring the color shift amount based on the measured color shift without setting the pattern image for the registration correction as the fixed image data.

On the other hand, in the recent image forming device, there is known a printing processing system in which all the processing in regard to the image generation is executed in a local PC side for reducing hardware costs.

Since in such an image forming device, the image generation is performed on the local PC, there is a problem that the image formation can not be made without the local PC.

In addition, in a case where in a system for performing an image generation on the local PC, the color shift amount measurement fails because of any cause to again generate a pattern image for registration correction, there occurs the following problem. That is, when the processing is executed on the local PC in consideration of the curve component of the laser beam and the mechanical inclination component, the error processing may be complicated.

In addition, even if the pattern image for the registration correction in which the color shift amount measurement has previously failed is used for once more performing the measurement, there is the problem with the possibility of the re-failure.

The present invention is made in view of the foregoing problem and an object of the present invention is to be capable of executing color shift correction processing in consideration of a mechanical inclination component even in a printing system to which a local PC is connected.

In addition, another object of the present invention is to provide a method of re-measurement in which, even in a case where any problem occurs on a printing device and the color shift correction processing fails, there are the high probability of no failure and no complication of the processing.

SUMMARY OF THE INVENTION

In order to solve the above-mentioned problem, an image forming device according to the present invention comprises, first measurement requesting unit for transmitting a measurement request for registration correction and digital correction to an information processing device, holding unit of curve information for holding the curve information obtained by the registration correction and the digital correction, notifying unit of curve information for notifying the information processing device of the curve information, receiving unit of a measurement pattern image for receiving the measurement pattern image used at the time of performing the registration correction and the digital correction from the information processing device, measurement processing unit for executing measurement processing of the registration correction and the digital correction based upon the measurement pattern image received by the receiving unit of the measurement pattern image, determining unit of a measurement processing result for determining the measurement result based upon the result of the measurement processing unit, and a second measurement requesting unit for updating the curve information to transmit a measurement request for once more performing the registration correction and the digital correction to the information processing device according to the measurement processing by the determining unit of the measurement processing result.

According to the present invention, generation of the pattern image for the registration correction or processing for dynamic digital correction is carried out on the information processing device outside of the image forming device, and therefore, the digital correction processing can be realized even in an inexpensive printer equipped with a limited resource alone.

In addition, even in a case where there occurs an error, such as an error to the extent that a shift amount exceeds an estimated range in the color shift correction processing, since the processing is executed based upon the curve component of the laser beam in a case of executing re-adjustment processing (retry), the probability of correctly making the correction increases.

In addition, in a case of executing the re-adjustment processing (retry), the curve information notified to the information processing device side outside of the image forming device is simply changed. Therefore, special processing in an error occurrence is not required in the information processing device side outside of the image forming device.

Further features of the present invention will become apparent from the following description of exemplary embodiments with reference to the attached drawings.

DESCRIPTION OF THE EMBODIMENTS

<Embodiments>

In an explanation of the following embodiments, registration correction means "correction of color shift".

Figure 1:
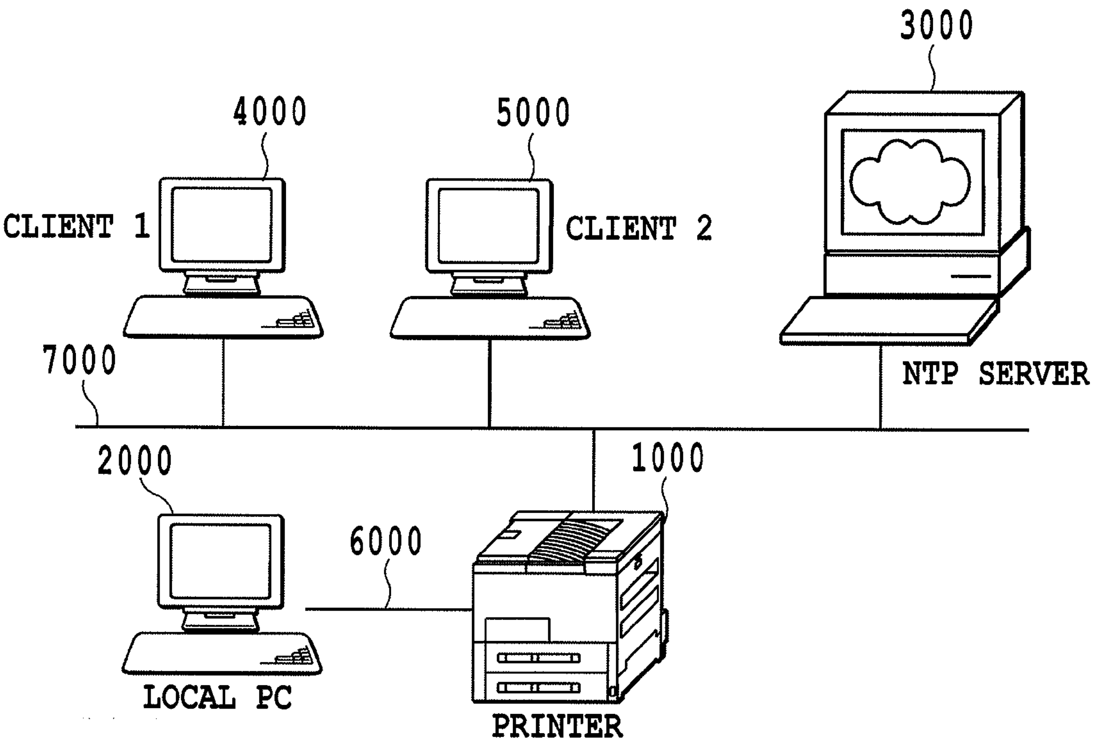
FIG. 1 is a schematic diagram showing a use environment of an image forming device according to an embodiment of the present invention.

FIG. 1 is a schematic diagram showing the use environment of an image forming device according to an embodiment of the present invention.

A printer 1000 in the present embodiment is through a USB cable 6000 to a local PC 2000. The printer 1000 has a network connection function and can communicate with a NTP server 3000, a PC 4000 of a client 1, a PC 5000 of a client 2 and the like through a network 7000.

Figure 2:
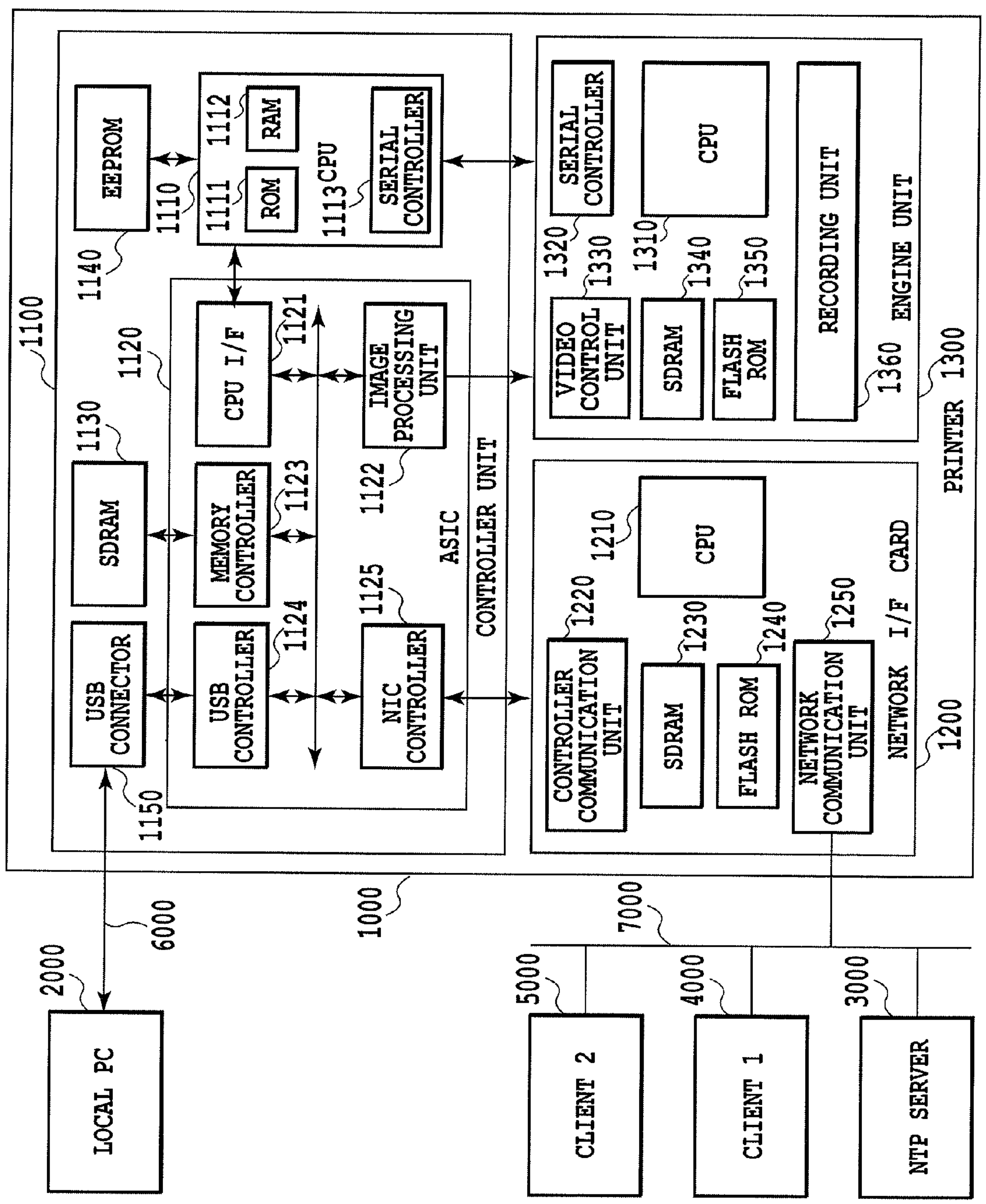
FIG. 2 is a block diagram showing a printer 1000 described in FIG. 1 according to the embodiment of the present invention.

FIG. 2 is a block diagram showing the printer 1000 described in FIG. 1 according to the embodiment of the present invention.

Figure 3:
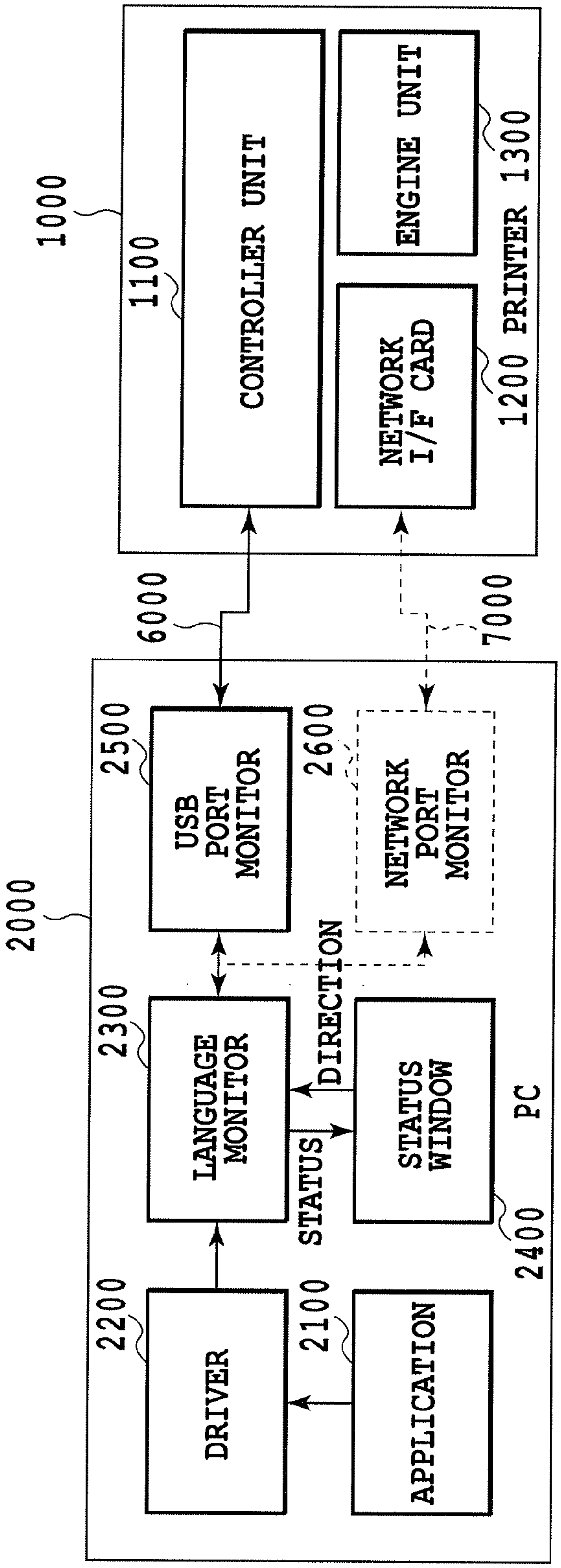
FIG. 3 is a block diagram showing the construction of software operating at a local PC 2000 or at a PC 40000 of a client 1 described in FIG. 1 according to the embodiment of the present invention, using the local PC 2000 representative thereof.

In addition, FIG. 3 is a block diagram showing the construction of software operating at a local PC 2000 or at a PC 40000 of a client 1 described in FIG. 1 according to the embodiment of the present invention, using the local PC 2000 representative thereof.

Hereinafter, a printer in the present embodiment and a rough flow of the print operation will be explained with reference with FIGS. 2 and 3.

The printer 1000 in the present embodiment, as shown in FIG. 3, comprises mainly the controller section 1100, a network interface card (hereinafter, refer to NIC) 1200, and an engine section 1300.

The printer 1000 is designed on condition that rendering of a print image or a print control is performed on a computer of the local PC 2000, the PC 4000 of the client 1, the PC 5000 of the client 2 or the like. In more detail, the rendering of the print image or the print control is performed in a driver 2200 or a language monitor 2300 as described in FIG. 3. Therefore, the controller section 1100, as shown in FIG. 2, comprises a CPU 1110, an ASIC 1120, an SDRAM 1130, an EEPROM 1140, and a USB connector 1150.

As shown in FIG. 2, the CPU 1110 houses a ROM 1111, a RAM 1112, and a serial controller 1113 for serial communication with the engine section 1300 therein.

Here, the ROM 1111 or the RAM 1112 has an extremely small capacity as compared to that of a printer itself performing the rendering or the print control.

Various control programs and various initial values are stored in the ROM 1111. In addition, in the RAM 1112, a work area and further, an area for storing data other than image data handled by the controller section 1100 are prepared. Since the RAM 1112 is a volatile RAM, limited information such as various counter values which are required to be held after a power source turns off is stored in the EEPROM 1140.

As shown in FIG. 2, the ASIC 1120 is a package for packing a CPU interface (I/F) 1121, an image processing section 1122, a memory controller 1123, a USB controller 1124, and an NIC controller 1125.

For example, as shown in FIG. 3, when the print processing is executed at an application 2100 on the local PC 2000, the driver 2200 is activated to generate an image data for printing.

It should be noted that in a system including the printer 1000 in the present embodiment, as shown in FIG. 3, digital correction processing of a scan line in a sub scan direction to printing by the application 2100 is executed at the driver 2200.

The image data generated at the driver 2200 is transmitted to the language monitor 2300. The language monitor 2300 transfers various commands for controlling the printing and the generated image data via a USB port monitor 2500 and a USB cable 6000 to the printer 1000 based upon a protocol in advance determined.

As shown in FIG. 2, in the printer 1000, the transferred command and data are received through the USB cable 6000 and the USB connector 1150 at the USB controller 1124. The CPU 1110 always monitors a state of the USB controller 1124 through the CPU interface (I/F) 1121.

When the CPU 1110 receives a command, the CPU 1110 executes the processing in accordance with the command. If the command is a command requiring the response, the CPU 1110 controls through the CPU interface (I/F) 1124 the USB controller 1124 to send the response status data back to the local PC 2000.

As shown in FIG. 3, the sent status is transferred through the USB cable 6000 and the USB port monitor 2500 to the language monitor 2300 and the content is notified to the status window 2400. The status window 2400 displays the printer and a status of the printing on a display section of the local PC 2000 as needed in accordance with the notified status.

As shown in FIG. 2, when the controller receives a command for transferring the print image subjected to the rendering, the CPU 1110 controls the USB controller 1124 and the memory controller 1123. In addition, the CPU **111*o* stores the image data subsequent to the command in the SDRAM 1130**.

As shown in FIGS. 2 and 3, when the image data is stored in the SDRAM 1130 in some degrees, the language monitor 2300 issues an activation request command of the engine section 1300. When the CPU 1110 recognizes the command, the CPU 1110 controls the serial controller 1113 to notify the engine section 1300 of an activation request. When it is notified through the serial controller 1113 that the engine section 1300 is normally activated and the transportation of the sheet is correctly carried out, the CPU 1110 controls the memory controller 1123 and the image processing section 1122. Further, the image data stored in the SDRAM 1130 is converted into a video signal which the engine section 1300 requires in an actual print operation and the video signal is sent to the engine section 1300.

Here, as shown in FIG. 2, the engine section 1300 comprises a CPU 1310, a serial controller 1320, a video control section 1330, an SDRAM 1340, a FLASH ROM 1350, and a record section 1360. The CPU 1310 controls an operation of an entire engine section. The video control section 1330 receives a video signal transmitted from the controller section 1100. The SDRAM 1340 has a work area and an area holding values showing various states. The FLASH ROM 1350 stores programs performed by the CPU 1310, various table values for reference, curve components of the laser beam by a scanner to be described later, and the like. The record section 1360 comprises a paper carrying system, a toner supplementing system, a laser bean control system, an intermediate transfer body, a fixing device system and the like.

When the CPU 1310 receives an activation request or a sheet carrying request of the record section 1360 from the controller section 1100, the CPU 1310 appropriately controls the record section 1360 to notify the controller section 1100 of the state as needed. If the image formation is started, the CPU 1310 controls the video control section 1330 to supply the video signal transmitted from the controller section 1100 to the record section 1360, thus forming an image.

The control between the controller section 1100 and the engine section 1300 which is performed at the time of correcting a pattern image for registration correction for measuring and correcting a color shift according to the present embodiment is basically the same as the above-mentioned. First, the controller section 1100 in FIG. 3 transfers a video signal representing the pattern image for the registration correction instead of the video signal representing the image to be printed. The engine section 1300 in FIG. 3 detects an edge of each color of the above pattern image formed in the intermediate transfer body by the video signal, with a reading sensor of the pattern image for the registration correction prepared at the record section 1360 in FIG. 2. Subsequently, according to the result of the detection a shift amount of a main scan and a sub scan of a scan line of the other color to a reference color in advance determined is calculated and the result is sent back to the controller section 1100 in FIG. 3. In the image forming device of the present embodiment, a block color is used as a reference color. However, the reference color may be any color without a direct relation with an essence of the present invention.

It should be noted that in a system including the printer 1000 in the present embodiment, as described later, the digital correction processing of the scan line in the sub scan direction to the pattern image for the registration correction is executed in the language monitor 2300.

On the other hand, a detail of the calculating processing and the like in regard to the color shift correction are the same way as the case of a known electronic photography-related engine, more detail thereof is omitted.

In addition, the status window 2400 described in FIG. 3 can receive an operation request of a user such as a temporal stop or cancellation of printing. The status window 2400 can arbitrarily indicate the registration correction processing and the operation request is transmitted to the language monitor 2300 as needed. The language monitor 2300 transfers a command in accordance with the transmitted operation request through the USB port monitor 2500 and the USB cable 6000 to the printer 1000 based upon the above determined protocol. Inconsequence, the processing in response to the command transferred by the controller section 1100 as described above is executed.

On the other hand, the NIC 1200, as described in FIG. 2, comprises a CPU 1210, a controller communication section 1220, an SDRAM 1230, a FLASH ROM 1240, and a network communication section 1250. The CPU 1210 controls an operation of the entire NIC. The controller communication section 1220 controls communication with the controller section 1100. The SDRAM 1230 has a work area and an area for holding values showing various states. The FLASH ROM 1240 stores programs executed at the CPU 1210 and various table values for reference. The network communication section 1250 controls an entire network communication based upon TCP/IP.

One of functions of the NIC 1200 in FIG. 3 is to perform intermediacy between the PC 4000 of the client 1 or the PC 5000 of the client 2 and the controller section 1100 in FIG. 1. In each client, the software which is exactly the same as the driver 2200 or the language monitor 2300 on the local PC 2000 and further, the network port monitor 2600 instead of the USB port monitor 2500 operate.

Various commands and image data issued from the language monitor 2300 in FIG. 3 are transmitted via a network port monitor 2600 and a network 7000 to the NIC 1200.

As shown in FIG. 2, the command which the NIC 1200 receives at the network communication section 1250 is transmitted to the controller section 1100 by controlling the controller communication section 1220. The controller section 1100 always monitors the NIC controller 1125 as in the case of the USB controller 1124.

The controller section 1100 processes the received command to return the status data through the NIC controller 1125 as needed to the NIC 1200. The NIC 1200 sends the status data received at the controller communication section 1220 back to a client as a source of the command issue by controlling the network communication section 1250. The sent status is transmitted from the language monitor 2300 in FIG. 3 to the status window 2400 and is displayed as needed. The processing of the image data via the network communication section 1250 is executed in the same way as a case of being executed from the local PC 2000 via the USB connector 1150.

Another function of the NIC 1200 is to obtain time information by having access to an NTP sever 3000 based upon a known NTP at a RFC-1305 for transmitting the content of the time information to the controller section 1100 as a command. The address of the NTP server 3000 can set a web server activation which the NIC 1200 mounts. The set address information is stored in the FLASH ROM 1240, which is held even if a power source turns off. It should be noted that since TCP/IP control or NTP processing is known and has no direct relation with the present invention, more detailed explanation is omitted.

Figure 4:
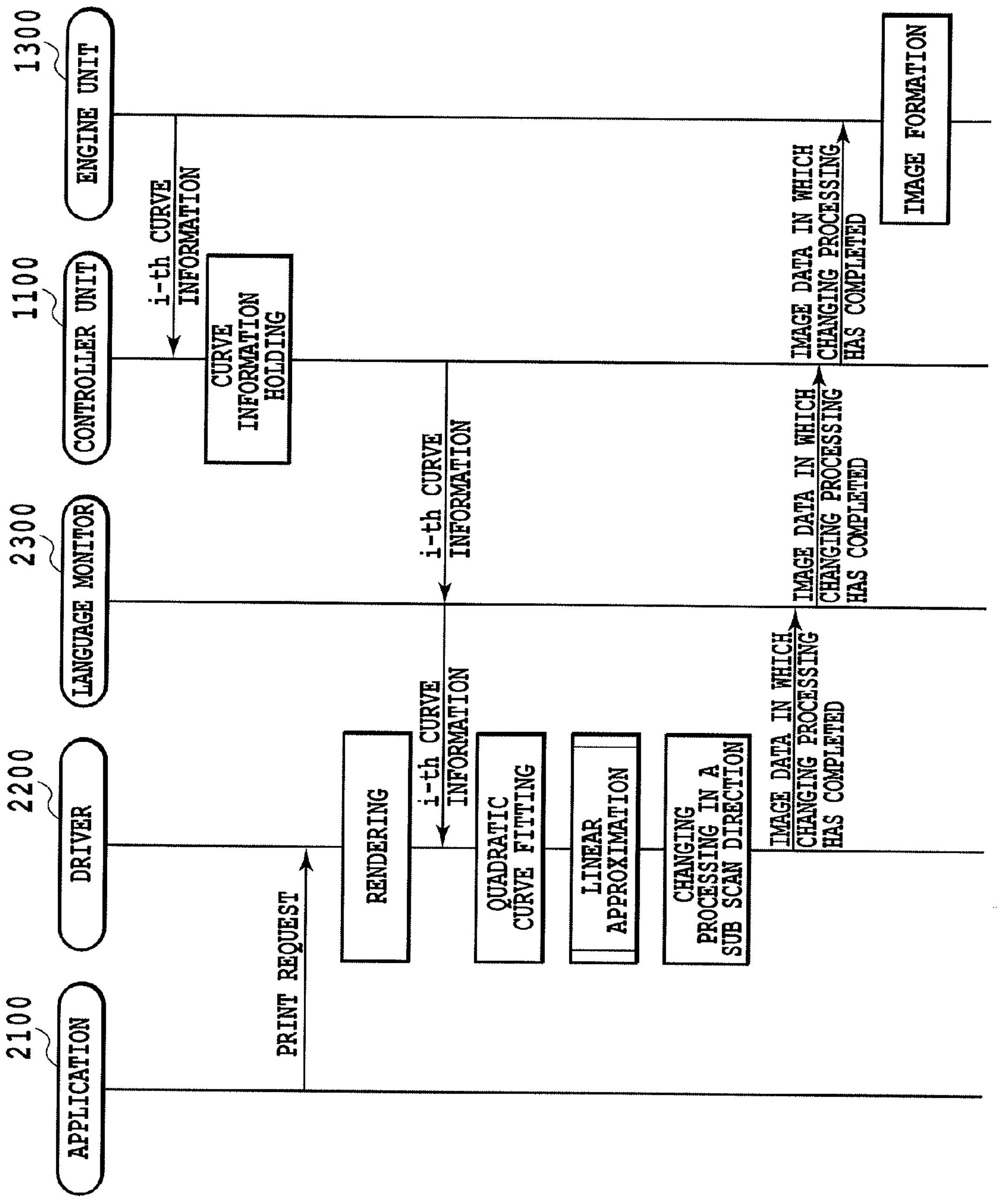
FIG. 4 is a diagram showing a relation between blocks relating to digital correction of the scan line in a sub scan direction to printing by the application 2100 described in FIG. 3 and each processing.

FIG. 4 is a diagram showing a relation between blocks relating to digital correction of the scan line in a sub scan direction to printing by the application 2100 described in FIG. 3 and each processing.

The controller section 1100 described in FIG. 3 in advance obtains i-th curve information measured at a timing i from the engine section 1300 and caches the obtained curve information on the RAM 1112.

Figure 7:
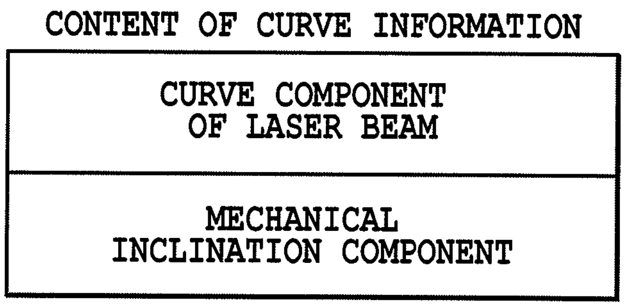
FIG. 7 is a diagram in regard to curve information held at a controller section 1100.

Here, the curve information usually includes both of curve components (fixed values) of the laser beam by the scanner and mechanical inclination components (variable values) by a shift of the transfer belt or the like as shown in FIG. 7. And the curve components of the laser beam are measured in the production process of the printer 1000 and stored in ROM 1111 or EPROM 1114 of the printer 1000.

As shown in FIG. 4, when a user carries out printing using the application 2100, the driver 2200 is loaded on an OS and the print request is sent from the application 2100 to the driver 2200.

Next, the driver 2200 executes rendering processing based upon the print request.

Then, the driver 2200 obtains the i-th curve information cached at the controller section 1100 through the language monitor 2300.

Here, the curve component and the mechanical inclination component of the laser beam included in the curve information of the present embodiment can be fitted to quadratic curve of "$f(x)=ax^2+bx+c$".

Next, the driver 2200 finds the above quadratic curve from the curve information and then, performs linear approximation.

A laser scanner unit in the present embodiment is produced so that, to a main scan width has 210 mm of a short side in A4, a curve component and a mechanical inclination component of the laser beam of a scan line in a sub scan direction "f(x)" is within a range less than 1 mm as a result of the processing in FIG. 4. That is, an error of the scan line in a sub scan direction is within a range in which the error can not be visually recognized when the image is printed on a sheet.

Further, the driver 2200, as described later, executes changing processing of a line of the image data to be formed in a sub scan direction of the scan line based upon the result of the linear approximation.

The changing processing of the line is disclosed in the U.S. patent application Ser. No. 12/345,523 by the same inventors of that of present inventions.

The image data to which the changing processing of the line in the sub scan direction of the scan line is completed is transferred through the language monitor 2300 and the controller section 1100 to the engine section 1300.

The engine section 1300, as explained in FIGS. 2 and 3, forms the image data which is supplied as a video signal and line-changed on a sheet by the record section 1360.

Figure 5:
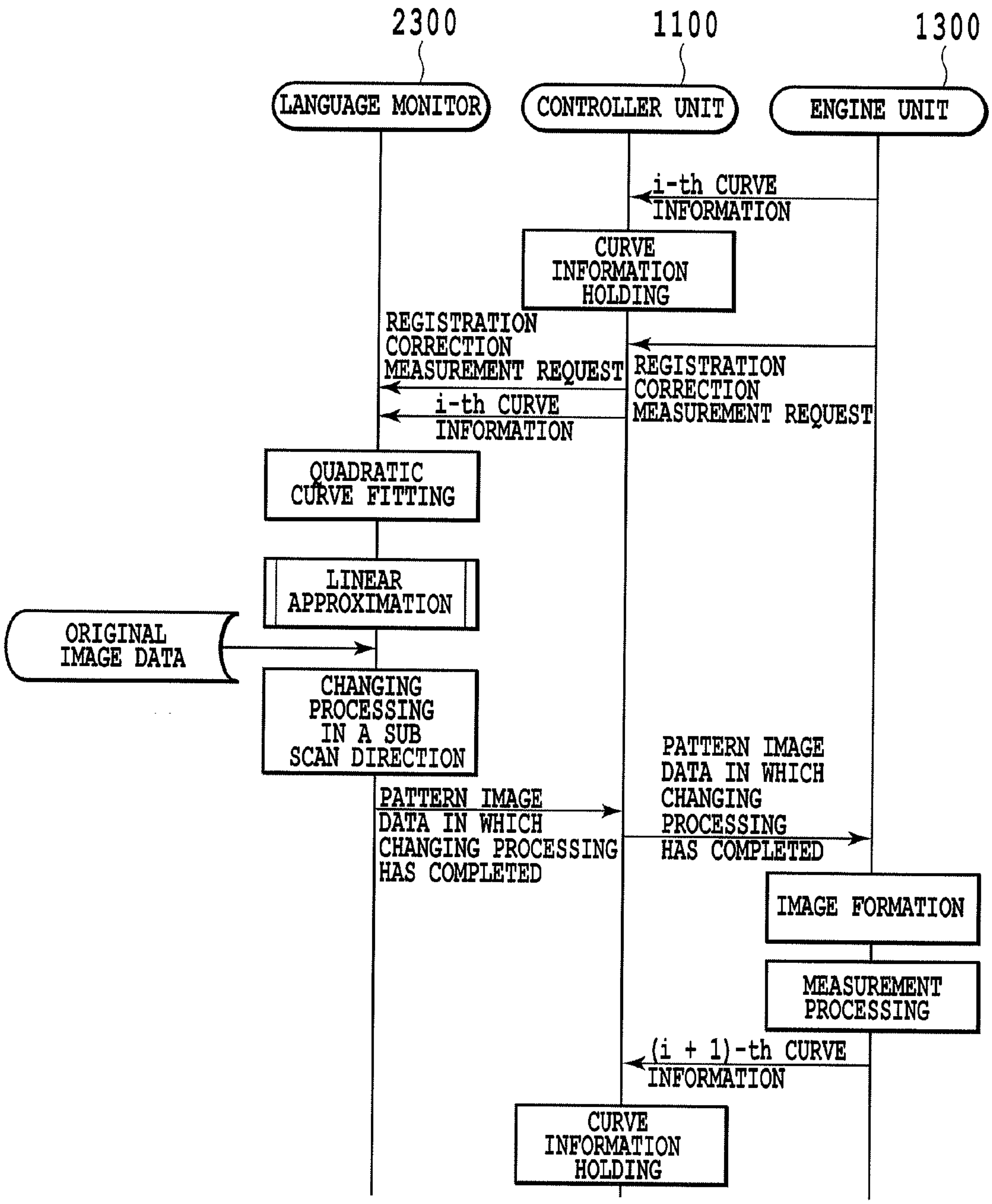
FIG. 5 is a diagram showing a relation between blocks relating to digital correction of the scan line in a sub scan direction to a pattern image for registration correction and each processing.

FIG. 5 is a diagram showing a relation between blocks relating to digital correction of the scanning line in a sub scan direction to a pattern image for registration correction and each processing.

Here, as one example, there is explained a case where a toner cartridge united with a photosensitive drum mounted in the engine section 1300 is replaced.

The controller section 1100 in advance obtains i-th curve information measured at a timing i from the engine section 1300 and caches the obtained curve information on the RAM 1112.

In addition, when the toner cartridge is replaced, a request of curve measurement is notified to the language monitor 2300 through the controller section 1100 from the engine section 1300.

It should be noted that herein, there is explained an example of a case where the toner cartridge is replaced. However, other than that, when a measurement request of a curve component of the laser beam and a mechanical inclination component based upon other conditions such as a change of an environment, a print number, and an elapse time is made from the engine section 1300, the processing is executed in the same way without mentioning. In addition, when a measurement request of a curve component of the laser beam and a mechanical inclination component is made from a user who is a printer user and checks the status window 2400, the processing is executed in the same way without mentioning.

The language monitor 2300 which has received the measurement request obtains the i-th curve information cached to the controller section 1100.

Then, the language monitor 2300 fits the curve information to a quadratic curve in the same way as the driver 2200 described in FIG. 4.

Further, the language monitor 2300 executes the processing of linear approximation.

The language monitor 2300 reads in an original image data of a pattern image for registration correction in advance prepared and executes changing processing of a line in a sub scan direction of a scan line in regard to the original image data of the pattern image for the registration correction using the linear approximation result.

The pattern image data for the registration correction in which the changing processing in the sub scan direction in the scan line is completed is transferred from the language monitor 2300 through the controller section 1100 to the engine section 1300.

The engine section 1300, as shown in FIGS. 2 and 3, forms a pattern image which is supplied and line-changed as a video signal on an intermediate transfer system at the record section 1360.

Then, the engine section 1300 detects an edge of each color of the pattern image for the registration correction formed in the intermediate transfer system and calculates a curve amount of each color for the finding. Further, the curve information including the found curve amount is sent back to the controller section 1100.

In the controller section 1100, the sent curve information is cached as (i +1)-th curve information measured at a timing i +1 on the RAM 1112 described in FIG. 2. The cached curve information is used to perform digital correction (such as the changing processing of the line) at printing in FIG. 4.

Figures 6, 6A:
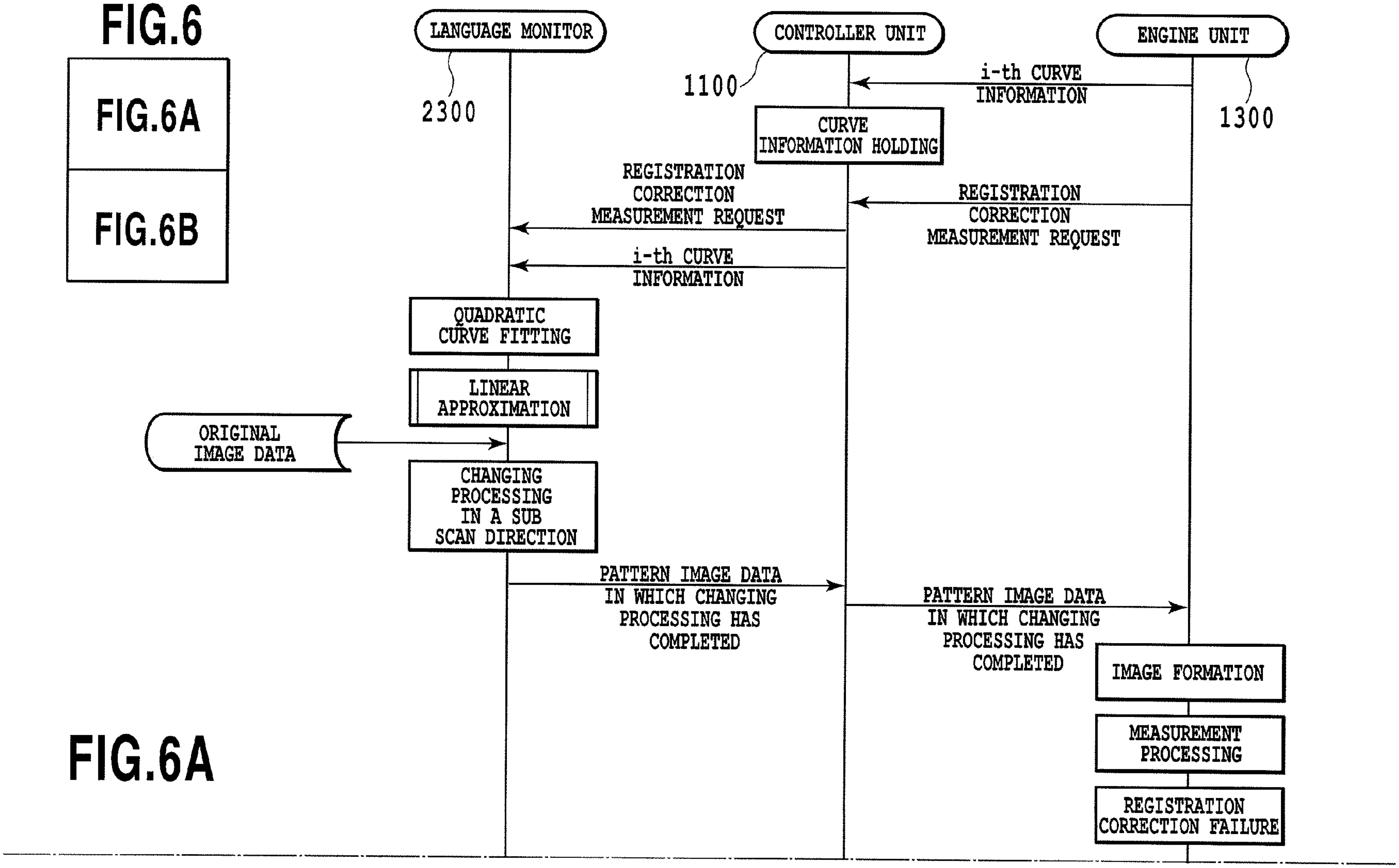
FIG. 6 is a diagram showing the relationship of FIGS. 6A and 6B.
FIG. 6A is a diagram showing a relation between blocks relating to digital correction of the scan line in a sub scan direction to a pattern image for registration correction in a case where registration correction processing fails and each processing.
Figure 6B:
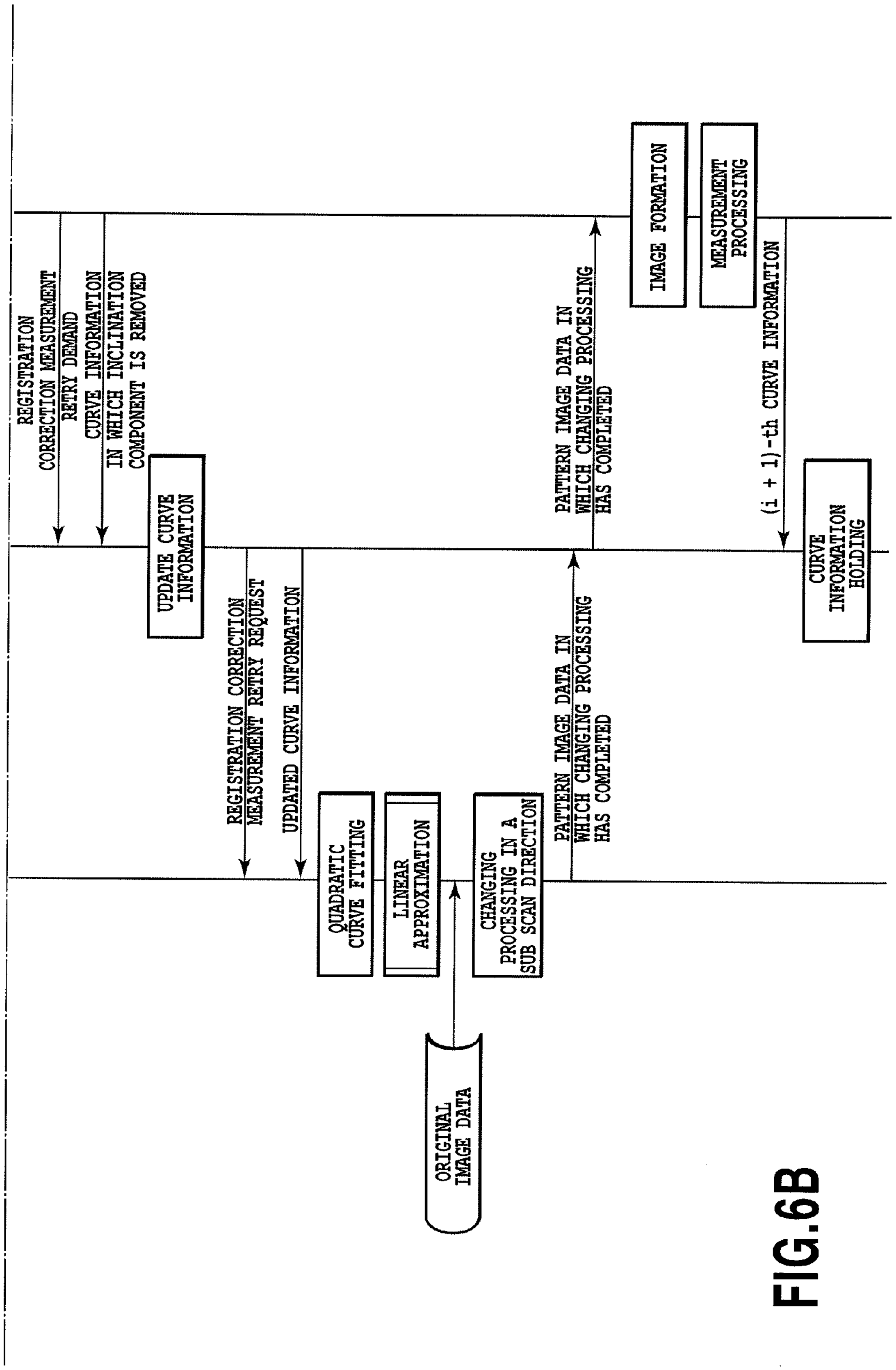
FIG. 6B is a diagram showing a relation between blocks relating to digital correction of the scan line in a sub scan direction to a pattern image for registration correction in a case where registration correction processing fails and each processing.

FIG. 6 is a diagram showing a relation between blocks relating to digital correction of the scanning line in a sub scan direction to a pattern image for registration correction in a case where registration correction processing fails and each processing, in the processing at registration correction described in FIG. 5.

The processing until the processing of the registration correction fails is the same as the processing described in FIG. 5.

The engine section 1300 detects an edge of each color of the pattern image for the registration correction formed in the intermediate transfer system and calculates a curve amount of each color for the finding. In a case where the curve amount is larger than the estimated amount due to any cause at this point, the image can not be possibly corrected normally at subsequent image formation. Therefore, the engine section 1300 notifies the controller section 1100 of a request for re-measurement for once more executing registration correction processing.

When the controller section 1100 receives a notice of the request for the re-measurement by the failure of registration correction processing from the engine section 1300, the controller section 1100 executes the following processing. That is, the controller section 1100, for updating the curve information cached on the RAM 1112, obtains only the curve component of the laser beam not including the mechanical inclination component from the engine section 1300 and updates it.

Hereinafter, in a case where the re-measurement of the registration correction processing is requested, the language monitor 2300, as in the case of the usual processing, obtains i-th curve information cached to the controller section 1100. The subsequent processing is the same as the processing explained in FIG. 5.

Figure 8:
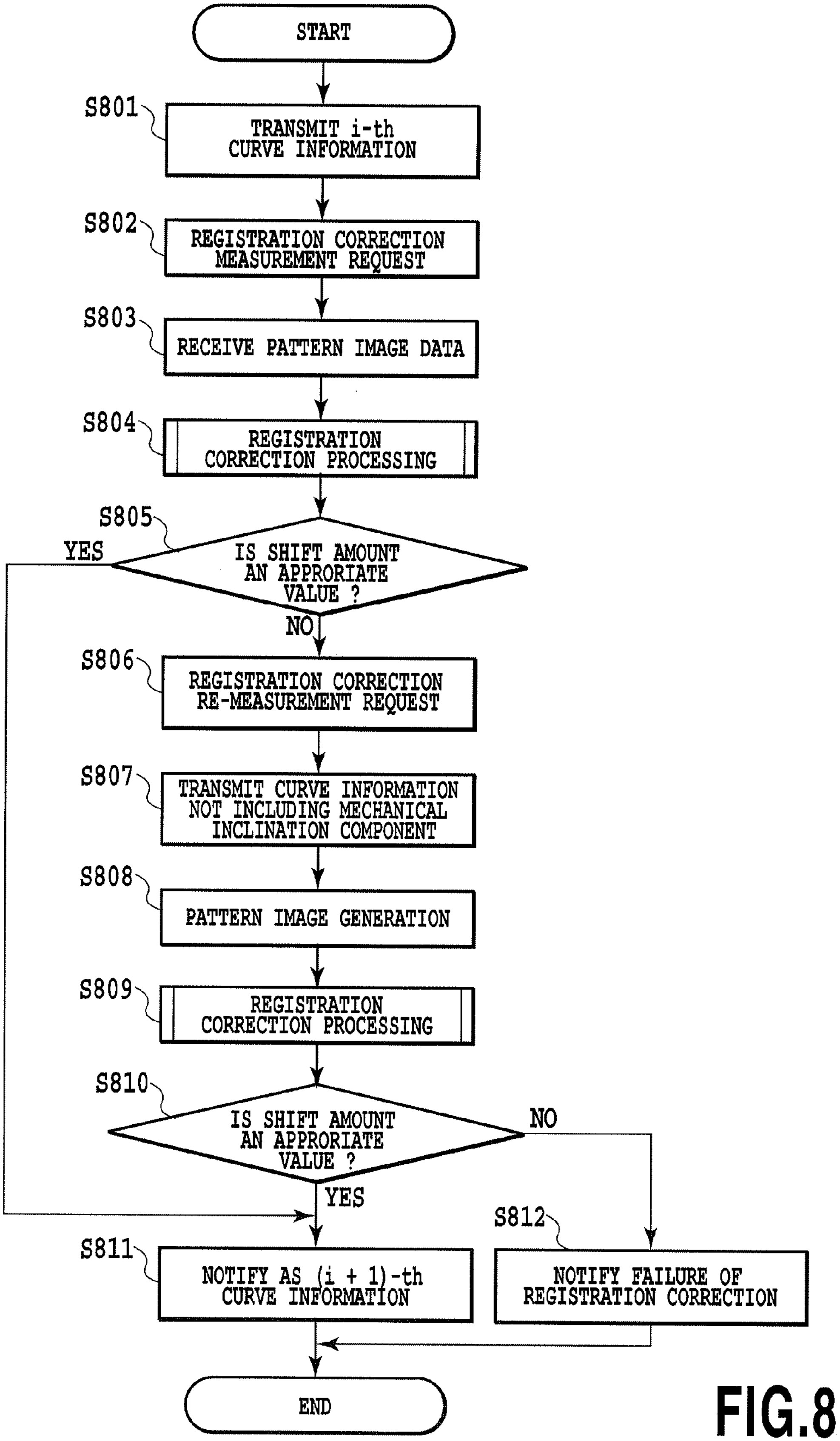
FIG. 8 is a flow chart showing a detail of the processing of an engine section 1300 in regard to the processing described in FIG. 6.
Figure 9:
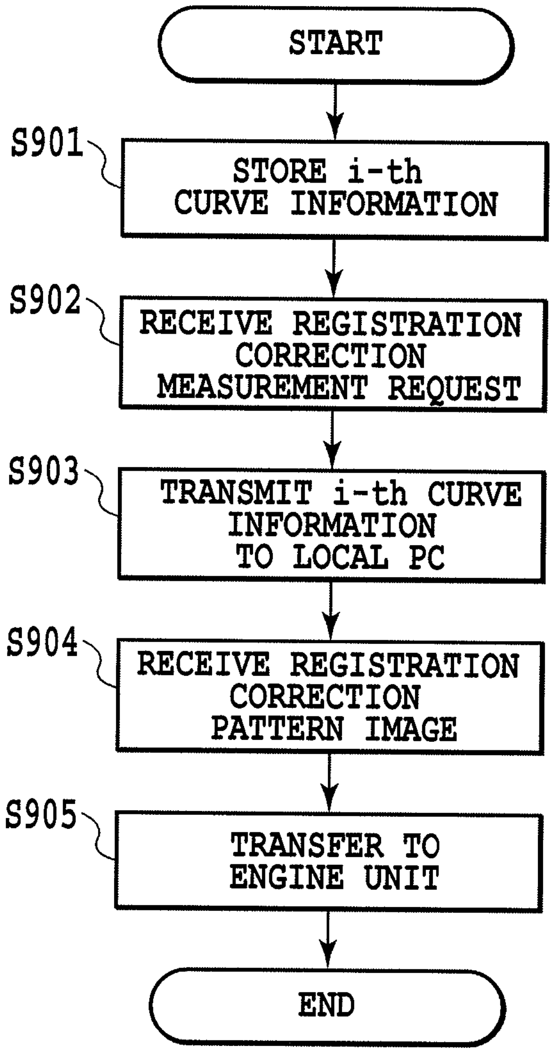
FIG. 9 is a flow chart showing a detail of the processing of the controller section 1100 in regard to the processing described in FIG. 6.
Figure 10:
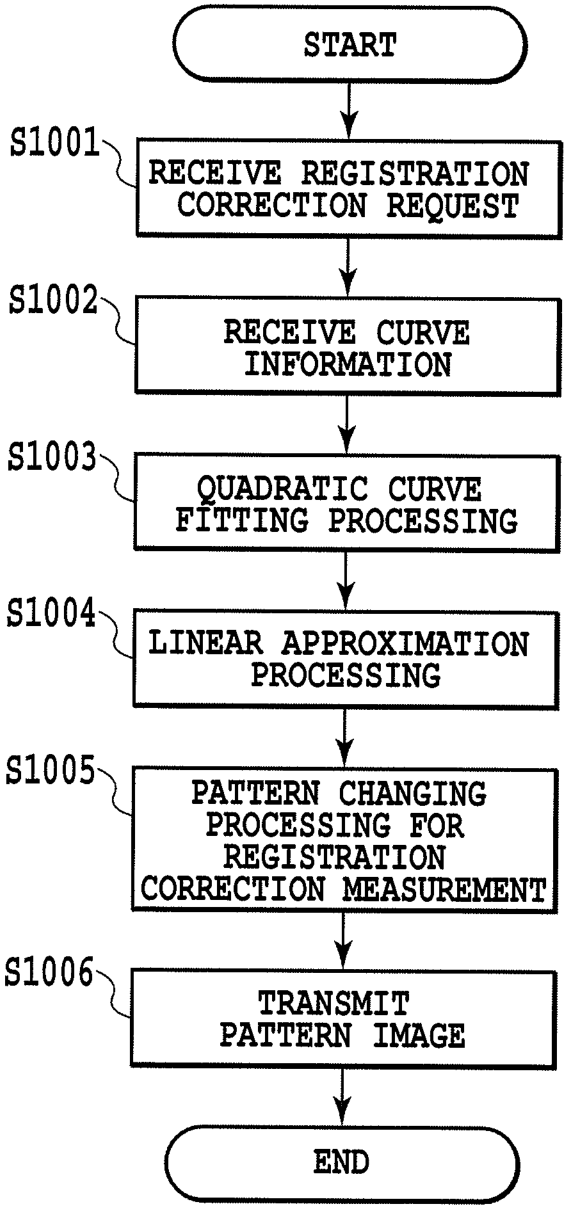
FIG. 10 is a flow chart showing a detail of the processing of a language monitor 2300 in regard to the processing described in FIG. 6.

FIGS. 8, 9, and 10 are flow charts showing a detail of the processing at a failure of the registration correction processing described in FIG. 6.

FIG. 8 describes the processing of the engine section 1300 and FIG. 9 describes the processing of the controller section 1100. In addition, FIG. 10 describes the processing of the language monitor 2300 which is the processing of the local PC 2000.

First, at step S801 in FIG. 8, the engine section 1300 transmits the i-th curve information to the controller section 1100. The i-th curve information includes both of a curve component of the laser beam by a scanner and a mechanical inclination component by a shift of the transfer belt as shown in FIG. 7.

In addition, at step S901 in FIG. 9, when the controller section 1100 receives the curve information from the engine section 1300, the controller section 1100 holds the curve information to the RAM 1112.

Next, at step S802 in FIG. 8, when a request for registration correction processing is generated due to the cause such as toner cartridge replacement, the engine section 1300 requests measurement of registration correction to the controller section 1100.

In addition, at step S902 in FIG. 9, the controller section 1100 receives a request for measurement of the registration correction.

Next at step S903 in FIG. 9, the controller section 1100 notifies the language monitor 2300 that there is the request for the registration correction processing. In addition, the controller section 1100 transmits the i-th curve information held at the RAM 1112 to the language monitor 2300 in the local PC 2000.

Here, using FIG. 10, the processing of the language monitor 2300 which is a module of the local PC 2000 to be executed next will be explained.

At step S1001 in FIG. 10, the language monitor 2300 receives the request for the registration correction processing.

Next, at step S1002 in FIG. 10, the language monitor 2300 receives the curve information from the controller section 1100.

Then, at step S1003 in FIG. 10, the language monitor 2300 carries out a quadratic curve fitting based upon the curve information received at step S1002.

Next, at step S1004 in FIG. 10, the language monitor 2300 executes the processing of linear approximation.

Next at step S1005 in FIG. 10, the language monitor 2300 reads in an original image data of a pattern image for registration correction in advance prepared and executes changing processing of a line in a sub scan direction of a scan line using the linear approximation result.

Next, at step S1006 in FIG. 10, the pattern image for the registration correction in which the changing processing of the line in the sub scan direction in the scan line is completed is transferred from the language monitor 2300 to the controller section 1100.

Next, at step S904 in FIG. 9, the controller section 1100 receives the pattern image for the registration correction notified from the language monitor 2300.

In addition, at step S905, in FIG. 9, the controller section 1100 transfers the pattern image for the registration correction to the engine section 1300.

In addition, at step S803 in FIG. 8, the engine section 1300 receives the pattern image data for the registration correction from the controller section 1100.

Next, at step S804 in FIG. 8, the engine section 1300 executes the registration correction processing.

More specially, an image is formed using a video signal representing the pattern image for the registration correction received from the controller section. Thereafter, an edge of each color of the above pattern image formed in the intermediate transfer system by the video signal is detected with the reading sensor of the pattern image for the registration correction prepared at the record section 1360. Subsequently, shift amounts of a main scan and a sub scan of a scan line of the other color to a reference color in advance determined are calculated.

Here, using FIG. 11, the curve amount calculating processing will be explained.

Figure 11:
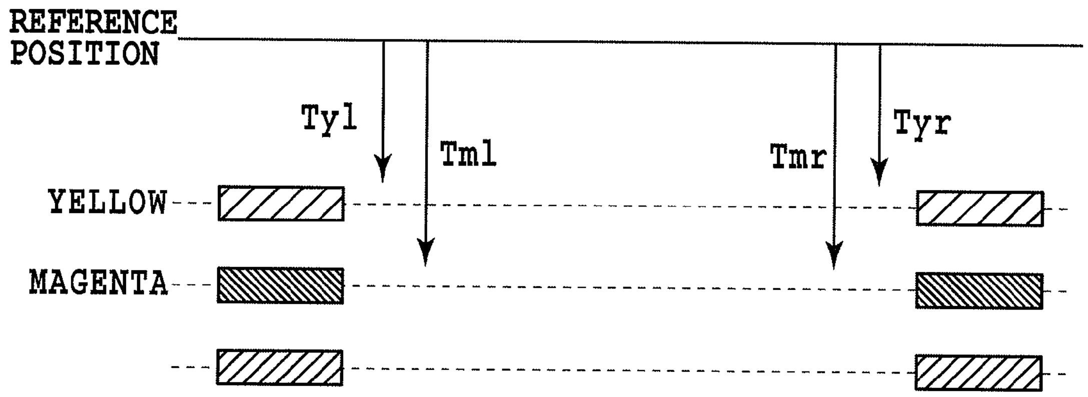
FIG. 11 is a diagram explaining curve amount calculating processing.

FIG. 11 is a diagram showing an outline of the processing for calculating curve information using the pattern image for the registration correction explained above.

In regard to the pattern image for the registration correction printed on the intermediate transfer element, the time from a reference position to the pattern image for the registration correction of each color is measured by the image reading sensor and the shift amount is calculated from the difference.

Here, Tyl is determined as time from a measurement of the reference position to a measurement of a left-side yellow patch. Tml is determined as time from the measurement of the reference position to a measurement of a left-side magenta patch. Tyr is determined as time from the reference position to a right-side yellow patch. Tmr is determined as time from the measurement of the reference position to a measurement of a right-side magenta patch. At this time, a color shift amount between yellow and magenta can be measured based upon each time difference between Tyl and Tml and between Tyr and Tmr. In addition, a curve amount of each color can be measured based upon each right-left measured time difference between Tyl and Tyr and between Tml and Tmr.

It should be noted that this method is simply one example and the pattern image for the registration correction and the calculation method are not limited to this method.

Next, at step S805 in FIG. 8, the engine section 1300 determines whether or not the result found by calculating the shift amount is an appropriate value.

At step S805, in a case where it is determined that the shift amount is appropriate (less than predetermined threshold value), at step S811 in FIG. 8, the engine section 1300 notifies the controller section 1100 of the value obtained by the registration correction processing as the (i+1)-th curve information.

In addition, at step S805, in a case where it is determined that the shift amount is not appropriate (more than predetermined threshold value), at step S806 the engine section 1300 requests a re-measurement request of the registration correction processing to the controller section 1100.

Next, at step S807 in FIG. 8, the engine section 1300 transmits the curve information which does not include the mechanical inclination component (fixed value) by the shift of the transfer belt or the like and includes only the curve information (variable value) of the laser beam by the scanner to the controller section 1100.

In addition, when the controller section 1100 receives the curve information from the engine section 1300, the controller section 1100 updates the curve information held at the RAM 1112. The subsequent processing in the controller is the same as the processing after step S901 in FIG. 9.

In addition, the controller section 1100 and the language monitor 2300 use the curve information updated at step S807 to once more generate the pattern image for the registration correction at step S808 in FIG. 8. An operation of the language monitor at this time is exactly the same as that at step S1001 to S1006.

Next, at step S808 in FIG. 8, after the language monitor 2300 generates the pattern image for the registration correction, at step S809 in FIG. 8 the pattern image for the registration correction is used to execute the registration correction processing.

Next, at step S810 in FIG. 8, the engine section 1300 determines once more whether or not the result found by calculating the shift amount is an appropriate value.

At step S810, in a case where it is determined that the shift amount is appropriate, at step S811 in FIG. 8 the engine section 1300 notifies the controller section 1100 of the value obtained by the registration correction processing as the (i+1)-th curve information.

In addition, at step S810, in a case where it is determined that the shift amount is not appropriate, at step S812 in FIG. 8 the engine section 1300 notifies the controller section 1100 that the registration correction processing fails.

A detailed explanation is omitted, but the controller section which has received the event that the registration correction processing has failed gives the notice to the local PC 2000. At this time, the local PC 2000 can display the failure on the status window 2400.

Figure 12:
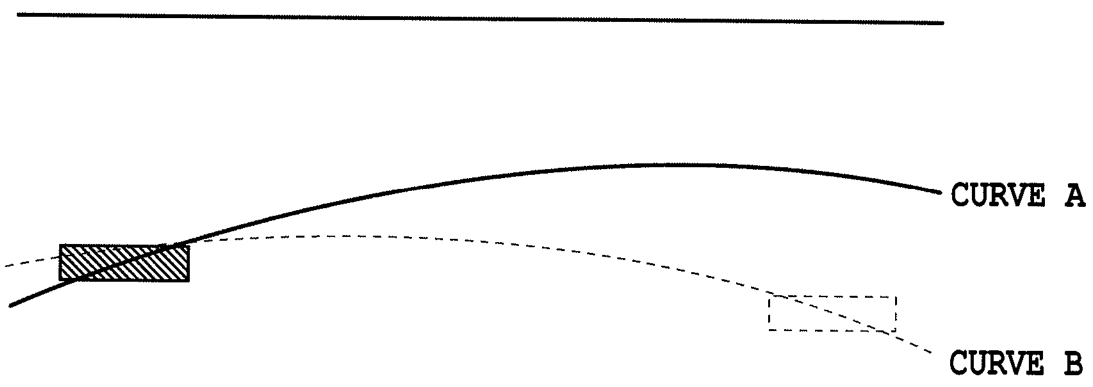
FIG. 12 is a diagram showing a relation between a curve amount and a pattern image for registration correction.
Figure 13:
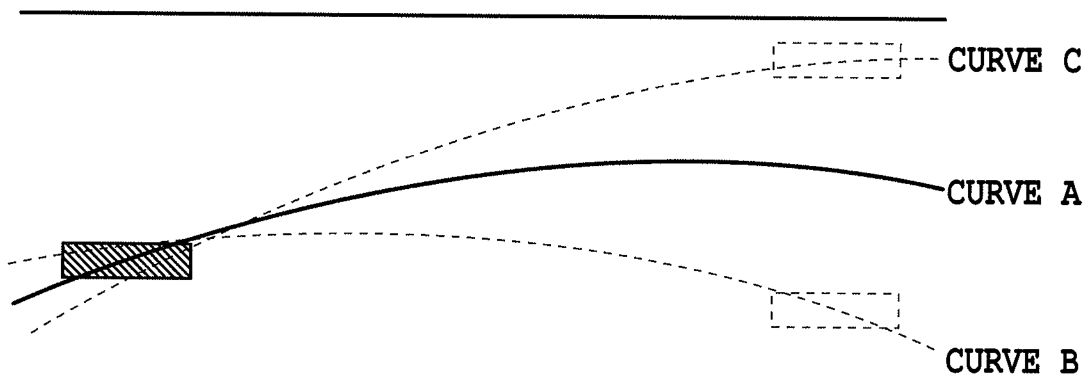
FIG. 13 is a diagram showing a relation between a curve amount and a pattern image for registration correction.

Here, FIGS. 12 and 13 are used to explain the effect of using the curve information including only the curve component of the laser beam by the scanner in a case where at step S807 it is determined that the shift amount is not appropriate.

FIGS. 12 and 13 show a relation between a curve amount and a pattern image for registration correction.

Curve A illustrates a curve amount including only a curve component of the laser beam by the scanner. Curve B illustrates a curve amount including not only a curve component of the laser beam but also a mechanical inclination component by the shift of the transfer belt or the like. Such a shift of the transfer belt is generated by, for example, replacement of a toner cartridge in a printer.

When the registration correction processing is executed, an image is generated so as to be in reverse to the curve of curve B based upon the curve amount of curve B (image data compensating for the curve amount), so that the curve is corrected.

The curve amount is usually measured based upon this curve B and as a result, the obtained curve amount is used to execute the next registration correction processing. This way allows the color shift correction processing with higher accuracy.

However, for example, when the toner cartridge is replaced, the curve characteristic is reversed to curve B by the reason such as a mechanical shift of the cartridge or a large shift is generated in the transfer belt because of any cause. In a case where the mechanical inclination component or the curve component of the laser beam is reversed due to such a large shift, the following problem occurs. That is, as in the case of curve C shown in FIG. 13, the curve amount having a reverse characteristic to curve B is generated.

In this case, even a pattern image for registration correction is generated based upon the curve information calculated based upon curve B, a pattern image for registration correction actually printed on the intermediate transfer element is shifted in the opposite direction. Even when in this state, the shift amount measurement is made, the shift amount largely exceeds an estimated range. As a result of calculating the shift amount, the calculated result is not an appropriate value. Or there is the possibility that because of a failure in the construction of the measurement, a mounting shift of the toner cartridge or the like, a shift measurement value exceeding an estimated range is obtained.

Then, when the curve information including only the curve component of the laser beam by the scanner of curve A is used to execute the registration correction processing, a difference from curve C is smaller. Therefore, the possibility that the result found by calculating the shift amount becomes an appropriate value increases.

As explained above, according to the present invention, generation of the pattern image for the registration correction or processing for dynamic digital correction is carried out on the local PC, and therefore, the digital correction processing can be realized even in an inexpensive printer equipped with a limited resource alone.

In addition, even in a case where there occurs an error, such as an error to the extent that a shift amount exceeds an estimated range in the color shift correction processing, since the processing is executed based upon different curve information in a case of once more executing the adjustment processing, the probability of correctly making the correction at retry increases. In a case where even after the registration measurement processing using the curve information including only the curve component of the laser beam by the scanner is executed, the shift measurement value exceeding the estimated range is still detected, an error display is displayed on a display section of the local PC 2000.

In addition, since at retry, the curve information notified to the local PC side is simply changed, special processing at error occurrence can be omitted in the local PC side.

In the present embodiment, there is a case where a plurality of measurement requesting unit exist. In this case, the respective measurement requesting unit may be called "first measurement requesting unit" and "second measurement requesting unit".

<Other Embodiment>

The present invention may be applied to a system constructed of a plurality of units (for example, a computer, an interface unit, a reader, a printer and the like) or a device comprising one unit (a complex device, a printer, a facsimile device or the like).

An object of the present invention can be achieved by reading out and implementing a program code from a memory medium storing the program code for achieving the procedure of the flow chart shown in the aforementioned embodiment, by a computer (CPU or MPU) of a system or a device. In this case, the program itself read from the memory medium is supposed to achieve the function of the aforementioned embodiment. Therefore, this program code and the computer-readable memory medium storing and recording the program code also constitute one of the present invention.

As the memory medium for supplying the program code, for example, a floppy (registered trade mark) disc, a hard disc, an optical disc, an optical magnetic disc, a CD-ROM, a CD-R, a magnetic tape, an involatile memory card, a ROM or the like can be used.

The function of the aforementioned embodiment can be achieved by implementing the program read out by the computer. In addition, the implementation of the program also includes a case where an OS or the like working on the computer performs a part or all of the actual processing based upon an instruction of the program.

Further, the function of the aforementioned embodiment can be realized by a function expansion board inserted into a computer or a function expansion unit connected to the computer. In this case, first, the program read from the memory medium is written in a memory equipped in a function expansion board inserted into a computer or a function expansion unit connected to the computer. Thereafter, a CPU or the like equipped in the function expansion board or the function expansion unit executes a part or all of the actual processing based upon an instruction of the program. The function of the aforementioned embodiment is also realized by the processing by such function expansion board or function expansion unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-041967, filed Feb. 22, 2008, which is hereby incorporated by reference herein in its entirety.

What is claimed is:

1. An image forming method executed in an image forming system comprising an image generating unit and an image forming unit, the image forming unit having a storage storing a first curve information including both components of a first type curve and a second type curve and a second curve information including a component of the first type curve without a component of the second type curve, the method comprising:

- a first information transmitting step of transmitting the first curve information stored in the storage to the image generating unit by the image forming unit;
- a first generating step of generating first corrected image data by shifting pixels included in predetermined pattern image data in a sub scan direction based on the first curve information transmitted in the first information transmitting step by the image generating unit;
- a first image transmitting step of transmitting the first corrected image data generated in the first generating step to the image forming unit by the image generating unit;
- a first forming step of forming a first image on a recording medium based on the first corrected image data transmitted in the first image transmitting step by the image forming unit;
- a first measuring step of measuring a shift amount of the first image formed in the first forming step from a predetermined reference by the image forming unit;
- a first storing step of storing a curve information calculated based on the shift amount measured in the first measuring step into the storage as the first curve information stored in the storage by the image forming unit, in a case where the shift amount measured in the first measuring step is less than a predetermined threshold value;

a second information transmitting step of transmitting the second curve information stored in the storage to the image generating unit by the image forming unit, in a case where the shift amount measured in the first measuring step is not less than the predetermined threshold value;

a second generating step of generating second corrected image data by shifting pixels included in the predetermined pattern image data in a sub scan direction based on the second curve information transmitted in the second information transmitting step by the image generating unit;

a second image transmitting step of transmitting the second corrected image data generated in the second generating step to the image forming unit by the image generating unit;

a second forming step of forming a second image on a recording medium based on the second corrected image data transmitted in the second image transmitting step by the image forming unit;

a second measuring step of measuring a shift amount of the second image formed in the second forming step from a predetermined reference by the image forming unit;

a second storing step of storing a curve information calculated based on the shift amount measured in the second measuring step into the storage as the first curve information stored in the storage by the image forming unit.

2. An image forming system comprising:

a storage configured to store a first curve information including both components of a first type curve and a second type curve and a second curve information including a component of the first type curve without a component of the second type curve;

a first information transmitting unit configured to transmit the first curve information stored in the storage;

a first generating unit configured to generate first corrected image data by shifting pixels included in predetermined pattern image data in a sub scan direction based on the first curve information transmitted by the first information transmitting unit;

a first image transmitting unit configured to transmit the first corrected image data generated by the first generating unit;

a first forming unit configured to form a first image on a recording medium based on the first corrected image data transmitted by the first image transmitting unit;

a first measuring unit configured to measure a shift amount of the first image formed by the first forming unit from a predetermined reference;

a first storing unit configured to store a curve information calculated based on the shift amount measured by the first measuring unit into the storage as the first curve information stored in the storage, in a case where the shift amount measured by the first measuring unit is less than a predetermined threshold value;

a second information transmitting unit configured to transmit the second curve information stored in the storage, in a case where the shift amount measured by the first measuring unit is not less than the predetermined threshold value;

a second generating unit configured to generate second corrected image data by shifting pixels included in the predetermined pattern image data in a sub scan direction based on the second curve information transmitted by the second information transmitting unit;

a second image transmitting unit configured to transmit the second corrected image data generated by the second generating unit;

a second forming unit configured to form a second image on a recording medium based on the second corrected image data transmitted by the second image transmitting unit;

a second measuring unit configured to measure a shift amount of the second image formed by the second forming unit from a predetermined reference;

a second storing unit configured to store a curve information calculated based on the shift amount measured by the second measuring unit into the storage as the first curve information stored in the storage.

3. The image forming system according to claim 2, wherein the first generating unit includes:

a first obtaining unit configured to obtain a correction amount for pixels included in the predetermined pattern image data by deriving an approximated curve of a curve of an image formed by the first forming unit based on the first curve information transmitted by the first information transmitting unit; and a first shifting unit configured to shift the pixels included in the predetermined pattern image data in a sub scan direction based on the correction amount obtained by the first obtaining unit, and the second generating unit includes:

a second obtaining unit configured to obtain a correction amount for pixels included in the predetermined pattern image data by deriving an approximated curve of a curve of an image formed by the second forming unit based on the second curve information transmitted by the second information transmitting unit; and a second shifting unit configured to shift the pixels included in the predetermined pattern image data in a sub scan direction based on the correction amount obtained by the second obtaining unit.

4. The image forming system according to claim 2, wherein the second storing unit stores a curve information calculated based on the shift amount measured by the second measuring unit into the storage as the first curve information stored in the storage, in a case where the shift amount measured by the second measuring unit is less than a predetermined threshold value, and displays an error notification in a displaying unit in a case where the shift amount measured by the second measuring unit is not less than the predetermined threshold value.

5. The image forming system according to claim 2, wherein an information processing device comprises the first generating unit, the first image transmitting unit, the second generating unit, and the second image transmitting unit, and an image forming device different from the information processing device comprises the storage, the first information transmitting unit, the first forming unit, the first measuring unit, the first storing unit, the second information transmitting unit, the second forming unit, the second measuring unit, and the second storing unit.

6. The image forming system according to claim 2, wherein the component of the first type curve is a curve component of a laser beam of a laser scanner which is used so that the image forming unit forms an image, and the component of the second type curve is a mechanical inclination component which includes a shift of a transfer belt.

7. The image forming system according to claim 2, wherein the predetermined pattern image data includes data of plural patch images corresponding respectively to plural colors;

the first forming unit and the second forming unit forms respectively the first image including the plural patch images and the second image including the plural patch images on a transfer belt;

the first measuring unit detects an edge of a patch image corresponding to a reference color among the plural patch images included in the first image and an edge of a patch image corresponding to a color other than the reference color among the plural patch images included in the first image, and measure the shift amount of the first image by measuring a temporal difference between detection timings of the detected edges; and the second measuring unit detects an edge of a patch image corresponding to a reference color among the plural patch images included in the second image and an edge of a patch image corresponding to a color other than the reference color among the plural patch images included in the second image, and measure the shift amount of the second image by measuring a temporal difference between detection timings of the detected edges.

8. An image forming device comprising:

an image forming unit configured to form an image based on image data generated by an image generating unit;

a storage configured to store a first curve information including both components of a first type curve and a second type curve and a second curve information including a component of the first type curve without a component of the second type curve;

a first information transmitting unit configured to transmit the first curve information stored in the storage to the image generating unit, wherein the image generating unit generates first corrected image data by shifting pixels included in predetermined pattern image data in a sub scan direction based on the first curve information transmitted by the first information transmitting unit and transmits the first corrected image data to the image forming unit;

wherein the image forming device further comprises:

a first forming unit configured to form a first image on a recording medium based on the transmitted first corrected image data;

a first measuring unit configured to measure a shift amount of the formed first image from a predetermined reference;

a first storing unit configured to store a curve information calculated based on the shift amount measured by the first measuring unit into the storage as the first curve information stored in the storage, in a case where the shift amount measured by the first measuring unit is less than a predetermined threshold value;

a second information transmitting unit configured to transmit the second curve information stored in the storage to the image generating unit in a case where the shift amount measured by the first measuring unit is not less than the predetermined threshold value, wherein the image generating unit generates second corrected image data by shifting pixels included in the predetermined pattern image data in a sub scan direction based on the second curve information transmitted by the second information transmitting unit and transmits the second corrected image data to the image forming unit;

a second forming unit configured to form a second image on a recording medium based on the transmitted second corrected image data;

a second measuring unit configured to measure a shift amount of the second image from the predetermined reference;

a second storing unit configured to store a curve information calculated based on the shift amount measured by the second measuring unit into the storage as the first curve information stored in the storage.

9. The image forming device according to claim 8, wherein the image generating unit, in a case where the first information transmitting unit transmits the first curve information, obtains a correction amount for pixels included in the predetermined pattern image data by deriving an approximated curve of a curve of an image formed by the image forming unit based on the first curve information transmitted by the first information transmitting unit and generates the first corrected image data by shifting the pixels included in the predetermined pattern image data in a sub scan direction based on the obtained correction amount, and, in a case where the second information transmitting unit transmits the second curve information, obtains a correction amount for pixels included in the predetermined pattern image data by deriving an approximated curve of a curve of an image formed by the image forming unit based on the second curve information transmitted by the second information transmitting unit and generates the second corrected image data by shifting the pixels included in the predetermined pattern image data in a sub scan direction based on the obtained correction amount.

10. The image forming device according to claim 8, wherein the image forming device stores a curve information calculated based on the shift amount measured by the second measuring unit into the storage by using the second storing unit as the first curve information stored in the storage, in a case where the shift amount measured by the second measuring unit is less than a predetermined threshold value, and displays an error notification in a displaying unit in a case where the shift amount measured by the second measuring unit is not less than the predetermined threshold value.

11. The image forming device according to claim 8, wherein an information processing device different from the image forming device functions as the image generating unit.

12. The image forming device according to claim 8, wherein the component of the first type curve is a curve component of a laser beam of a laser scanner which is used so that the image forming unit forms an image, and the component of the second type curve is a mechanical inclination component which includes a shift of a transfer belt.

13. The image forming device according to claim 8, wherein the predetermined pattern image data includes data of plural patch images corresponding respectively to plural colors;

the first forming unit and the second forming unit forms respectively the first image including the plural patch images and the second image including the plural patch images on a transfer belt;

the first measuring unit detects an edge of a patch image corresponding to a reference color among the plural patch images included in the first image and an edge of a patch image corresponding to a color other than the reference color among the plural patch images included in the first image, and measure the shift amount of the first image by measuring a temporal difference between detection timings of the detected edges; and the second measuring unit detects an edge of a patch image corresponding to a reference color among the plural patch images included in the second image and an edge of a patch image corresponding to a color other than the reference color among the plural patch images included in the second image, and measure the shift amount of the second image by measuring a temporal difference between detection timings of the detected edges.

14. An image forming method implemented by an image forming device comprising an image forming unit configured to form an image based on image data generated by an image generating unit, the method comprising:

storing, by a storage, a first curve information including both components of a first type curve and a second type curve and a second curve information including a component of the first type curve without a component of the second type curve;

transmitting, by a first information transmitting unit, the first curve information stored in the storage to the image generating unit, wherein the image generating unit generates first corrected image data by shifting pixels included in predetermined pattern image data in a sub scan direction based on the first curve information transmitted by the first information transmitting unit and transmits the first corrected image data to the image forming unit;

forming, by a first forming unit, a first image on a recording medium based on the transmitted first corrected image data;

measuring, by a first measuring unit, a shift amount of the formed first image from a predetermined reference;

storing, by a first storing unit, a curve information calculated based on the shift amount measured by the first measuring unit into the storage as the first curve information stored in the storage, in a case where the shift amount measured by the first measuring unit is less than a predetermined threshold value;

transmitting, by a second information transmitting unit, the second curve information stored in the storage to the image generating unit in a case where the shift amount measured by the first measuring unit is not less than the predetermined threshold value, wherein the image generating unit generates second corrected image data by shifting pixels included in the predetermined pattern image data in a sub scan direction based on the second curve information transmitted by the second information transmitting unit and transmits the second corrected image data to the image forming unit;

forming, by a second forming unit, a second image on a recording medium based on the transmitted second corrected image data;

measuring, by a second measuring unit, a shift amount of the second image from a predetermined reference; and storing, by a second storing unit, a curve information calculated based on the shift amount measured by the second measuring unit into the storage as the first curve information stored in the storage.

15. The image forming method according to claim 14, wherein in a case where the first information transmitting unit transmits the first curve information, the image generating unit, obtains a correction amount for pixels included in the predetermined pattern image data by deriving an approximated curve of a curve of an image formed by the image forming unit based on the first curve information transmitted by the first information transmitting unit and generates the first corrected image data by shifting the pixels included in the predetermined pattern image data in a sub scan direction based on the obtained correction amount, and, in a case where the second information transmitting unit transmits the second curve information, the image generating unit obtains a correction amount for pixels included in the predetermined pattern image data by deriving an approximated curve of a curve of an image formed by the image forming unit based on the second curve information transmitted by the second information transmitting unit and generates the second corrected image data by shifting the pixels included in the predetermined pattern image data in a sub scan direction based on the obtained correction amount.

16. The image forming method according to claim 14, wherein the image forming device stores a curve information calculated based on the shift amount measured by the second measuring unit into the storage by using the second storing unit as the first curve information stored in the storage, in a case where the shift amount measured by the second measuring unit is less than a predetermined threshold value, and displays an error notification in a displaying unit in a case where the shift amount measured by the second measuring unit is not less than the predetermined threshold value.

17. The image forming method according to claim 14, wherein an information processing device different from the image forming device functions as the image generating unit.

18. The image forming method according to claim 14, wherein the component of the first type curve is a curve component of a laser beam of a laser scanner which is used so that the image forming unit forms an image, and the component of the second type curve is a mechanical inclination component which includes a shift of a transfer belt.

19. The image forming method according to claim 14, wherein the predetermined pattern image data includes plural patch images corresponding respectively to plural colors;

in the forming steps by the first and second forming units, the first forming unit and the second forming unit forms respectively the first image including the plural patch images and the second image including the plural patch images on a transfer belt;

in the measuring step by the first measuring unit, the first measuring unit detects an edge of a patch image corresponding to a reference color among the plural patch images included in the first image and an edge of a patch image corresponding to a color other than the reference color among the plural patch images included in the first image, and measure the shift amount of the first image by measuring a temporal difference between detection timings of the detected edges; and in the measuring step by the second measuring unit, the second measuring unit detects an edge of a patch image corresponding to a reference color among the plural patch images included in the second image and an edge of a patch image corresponding to a color other than the reference color among the plural patch images included in the second image, and measure the shift amount of the second image by measuring a temporal difference between detection timings of the detected edges.

20. A non-transitory computer-readable storage medium storing a program for causing a computer to function as an image forming device, the image forming device comprising an image forming unit configured to form an image based on image data generated by an image generating unit, the image forming device further comprises:

a storage configured to store a first curve information including both components of a first type curve and a second type curve and a second curve information including a component of the first type curve without a component of the second type curve;

a first information transmitting unit configured to transmit the first curve information stored in the storage to the image generating unit, wherein the image generating unit generates first corrected image data by shifting pixels included in predetermined pattern image data in a sub scan direction based on the first curve information transmitted by the first information transmitting unit and transmits the first corrected image data to the image forming unit;

a first forming unit configured to form a first image on a recording medium based on the transmitted first corrected image data;

a first measuring unit configured to measure a shift amount of the formed first image from a predetermined reference;

a first storing unit configured to store a curve information calculated based on the shift amount measured by the first measuring unit into the storage as the first curve information stored in the storage, in a case where the shift amount measured by the first measuring unit is less than a predetermined threshold value;

a second information transmitting unit configured to transmit the second curve information stored in the storage to the image generating unit in a case where the shift amount measured by the first measuring unit is not less than the predetermined threshold value, wherein the image generating unit generates second corrected image data by shifting pixels included in the predetermined pattern image data in a sub scan direction based on the second curve information transmitted by the second information transmitting unit and transmits the second corrected image data to the image forming unit;

a second forming unit configured to form a second image on a recording medium based on the transmitted second corrected image data;

a second measuring unit configured to measure a shift amount of the second image from a predetermined reference; and a second storing unit configured to store a curve information calculated based on the shift amount measured by the second measuring unit into the storage as the first curve information stored in the storage.

* * * * *